2,556,377

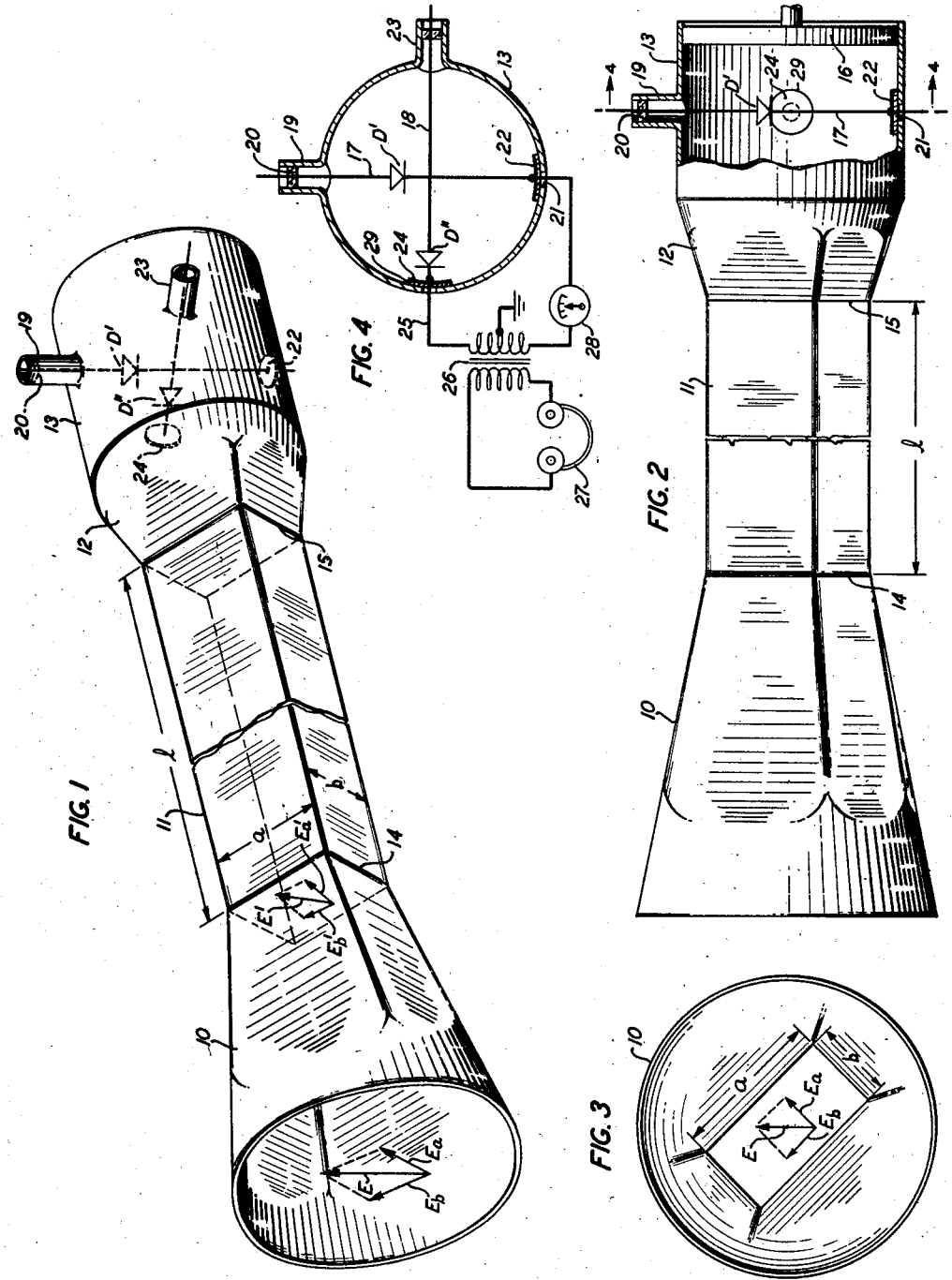
June 12, 1951 — S. D. ROBERTSON — 2,556,377
DETECTING SYSTEM FOR FREQUENCY MODULATED WAVES
Filed Aug. 6, 1946 — 2 Sheets-Sheet 1
INVENTOR
S. D. ROBERTSON
BY
E. V. Griggs
ATTORNEY June 12, 1951  S. D. ROBERTSON  2,556,377
DETECTING SYSTEM FOR FREQUENCY MODULATED WAVES
Filed Aug. 6, 1946  2 Sheets-Sheet 2
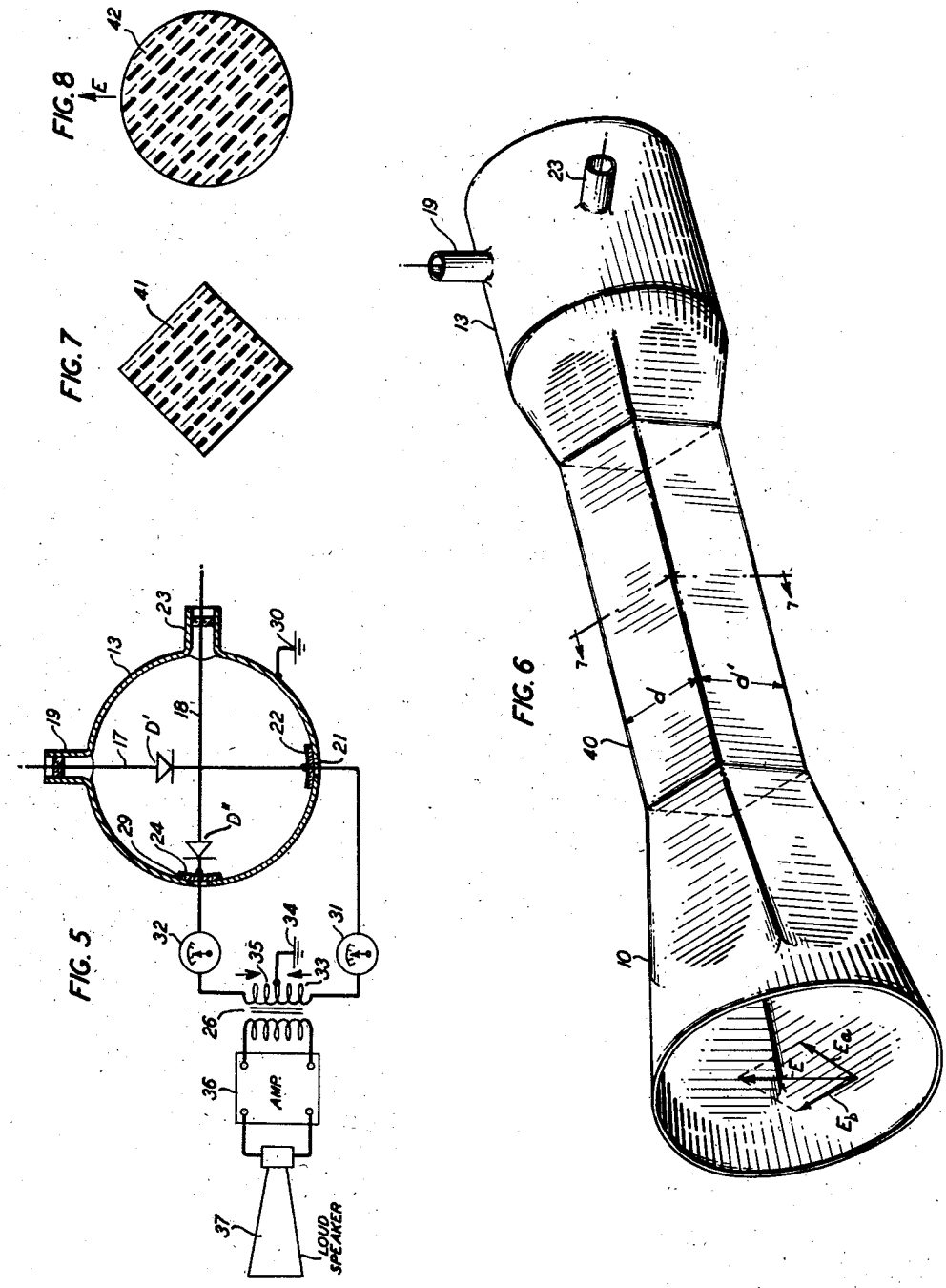
INVENTOR
S. D. ROBERTSON
BY
E. V. Griggs
ATTORNEY Patented June 12, 1951

UNITED STATES PATENT OFFICE 2,556,377

DETECTING SYSTEM FOR FREQUENCY MODULATED WAVES

Sloan D. Robertson, Red Bank, N. J., assignor to Bell Telephone Laboratories, Incorporated, New York, N. Y., a corporation of New York Application August 6, 1946, Serial No. 688,740

11 Claims. (Cl. 250—27)

1

This invention relates to electric wave detecting systems and more particularly to systems for detecting frequency modulated microwaves.

An object of the invention is to derive from electrically polarized microwaves which are frequency-modulated in accordance with signals, electric currents corresponding in wave form and intensity to the modulating signals.

Another object of the invention is to enable direct frequency measurment of microwaves without the necessity of manipulation of apparatus on the part of the measuring operator.

In accordance with the invention frequency-modulated microwaves are impressed on a wave guide having an oblong or rectangular transverse section in such fashion that the plane of the transverse electric vector of the waves extends in a direction oblique to both the maximum and minimum transverse dimensions of the wave guide. The two perpendicular components of the electric vector respectively parallel to the short and long transverse dimensions of the wave guide travel along a section of the wave guide with unequal phase velocities and emerge with a phase difference which is a function of the instantaneous frequency. They are then introduced into a section of wave guide having a circular cross-section where they combine to produce a dominant wave whose state of polarization is determined by the phase difference of the two components. The dominant wave is then impressed upon two crystal pick-ups perpendicular to one another and transverse to the circular wave guide. The outputs of the two crystals are combined in opposing relation to produce two opposing rectified components whose magnitudes relative to each other depend upon the state of polarization of the dominant wave and thus to yield a resultant current whose magnitude and phase is determined by the instantaneous input frequency. If the resultant current be supplied to a meter, the meter may be calibrated to indicate directly the instantaneous frequency of the microwaves. If the resulting current be applied to signal indicating apparatus such as a telephone receiver, the receiver will reproduce speech or other sound signals by which the microwaves were modulated.

The drawing Fig. 1 shows in perspective a microwave guide system constituting one embodiment of the invention in which frequency-modulated waves are detected or demodulated;

Fig. 2 is a side view of the structure of Fig. 1 with a portion of the wall broken away to show one of the microwave detector elements;

Fig. 3 is an end view looking at the horn input transducer of Fig. 2;

Fig. 4 is a transverse section at line 4—4 of the structure of Fig. 2, together with a schematic of the associated detector and indicator circuit;

Fig. 5 shows a modification of the schematic of Fig. 4;

Fig. 6 is a modification of the apparatus of Fig. 1 involving a square wave guide section with an anisotropic dielectric;

Fig. 7 is a section of the wave guide of Fig. 6 along the line 7—7; and

Fig. 8 shows a modification of the structure of Fig. 7.

Referring to Fig. 1 an open-ended conical pickup horn 10 is shown having its smaller end conformed to the transverse configuration of a connected rectangular wave guide section 11 to which the horn 10 supplies microwave energy. The opposite end of the rectangular wave guide is connected by a flaring coupler 12 to the cylindrical wave guide section 13.

The rectangular wave guide section 11 is constructed with a wider dimension $a$ and a narrower dimension $b$ at right angles thereto. If the system of Fig. 1 be so oriented with reference to a transverse electrically polarized incoming microwave that the plane of the electric vector indicated by the arrow E at the mouth of the horn 10 will extend in a direction bisecting the angle between one of the longer sides and one of the shorter sides of the wave guide section 11 transmission of the polarized wave through the horn 10 and the section 11 may be calculated on the basis of the vectors $E_a$ and $E_b$ perpendicular respectively to the broad side of dimension $a$ and the narrow side of dimension $b$. By suitably orienting the wave guide 11 the component energies associated respectively with the vectors $E_a$ and $E_b$ may be made of equal intensity at the entrance plane of the horn 10 and the vectors $E_a$ and $E_b$ will be of equal magnitude as indicated in Fig. 3.

The horn 10 serves the purpose of an impedance transformer which transforms the vector component $E_a$ at its entrance plane into a similarly directed vector component $E_a'$ at plane 14 and the vector component $E_b$ to a vector component $E_b'$ extending in the same direction as $E_b$ but positioned in the plane 14. The energies associated with the vectors $E_a'$ and $E_b'$, assuming the horn 10 to be an ideal transformer and hence without loss, remain equal but the vectors $E_a'$ and $E_b'$, themselves, are no longer equal since the vector $E_b'$ perpendicular to the smaller dimension $b$ faces a higher impedance than does the vector $E_a'$ perpendicular to the larger dimension $a$. Because of this relative increase of the vector $E_b'$ the resultant vector $E'$ will be oriented in a direction representing a counter-clockwise rotation with reference to the direction of the original vector E.

Because of the difference in the transverse dimensions $a$ and $b$ of the guide, the two perpendicular components $E_a'$ and $E_b'$ will travel along the guide with unequal phase velocities. The guide is preferably so designed with respect to the dimensions $a$ and $b$ that for a frequency $f_1$ the two components shall emerge at the plane 15 with a phase difference equal to an integral number of wavelengths and that at a frequency $f_2$ the two components shall have a phase difference equal to an odd multiple of half wavelengths. At frequency $f_1$, the wavelengths $\lambda_{1a}$ and $\lambda_{1b}$ along the guide for the two components may be expressed as follows:

$$\lambda_{1a} = \frac{C}{\sqrt{f_1^2 - \frac{C^2}{4a^2}}} \quad (1)$$

$$\lambda_{1b} = \frac{C}{\sqrt{f_1^2 - \frac{C^2}{4b^2}}}$$

where C is the velocity of electromagnetic waves in free space. At frequency $f_2$ the corresponding wave lengths $\lambda_{2a}$ and $\lambda_{2b}$ are:

$$\lambda_{2a} = \frac{C}{\sqrt{f_2^2 - \frac{C^2}{4a^2}}} \quad (2)$$

$$\lambda_{2b} = \frac{C}{\sqrt{f_2^2 - \frac{C^2}{4b^2}}}$$

In order to satisfy the phase requirement, namely, that components $E_a'$ and $E_b'$ arrive at the plane 15 with a phase difference equal to an integral number of wavelengths, the length $l$ of the section 11 must be made such that it constitutes an integral number of wavelengths more for the $E_a'$ component than for the $E_b'$ component. In other words $$\frac{l}{\lambda_{1a}} - \frac{l}{\lambda_{1b}} = n \quad (3)$$

where $n$ is a positive integer. Similarly to provide the odd number of half wavelengths difference at frequency $f_2$ it is necessary to satisfy the following equation:

$$\frac{l}{\lambda_{2a}} - \frac{l}{\lambda_{2b}} = n - \tfrac{1}{2} \quad (4)$$

Solving Equation 3 for the length of the section $$l = \frac{\lambda_{1a}\lambda_{1b}}{\lambda_{1b} - \lambda_{1a}} n \quad (5)$$

A similar solution of Equation 4 yields $$l = \frac{\lambda_{2a}\lambda_{2b}}{\lambda_{2b} - \lambda_{2a}} (n - \tfrac{1}{2}) \quad (6)$$

Equating the second members of the Equations 5 and 6

$$n\frac{\lambda_{1a}\lambda_{1b}}{\lambda_{1b} - \lambda_{1a}} = \frac{\lambda_{2a}\lambda_{2b}}{\lambda_{2b} - \lambda_{2a}}(n - \tfrac{1}{2}) \quad (7)$$

If the dimensions $a$, $b$, and $l$ are chosen so that Equations 5, 6, and 7 are satisfied, then at the frequency $f_1$ the two components $E_a'$ and $E_b'$ will combine in guide section 13 to produce a dominant wave which is polarized in the same plane as E, whereas at the frequency $f_2$ the components will combine to produce a wave polarized in a plane perpendicular to E. At an intermediate frequency $f_0$, substantially midway between $f_1$ and $f_2$, the components $E_a'$ and $E_b'$ will arrive at plane 15 with a phase difference of 90 degrees. In this condition they will combine to produce a circularly polarized dominant wave in the guide section 13.

At the plane 15 the section 11 is terminated by a coupler 12 designed as a lossless impedance transformer to provide as smooth an impedance match as is practicable between the section 11 and the terminal of cylindrical section 13. The coupler 12 serves also to transform the magnitudes of components $E_a'$ and $E_b'$ in a manner converse to that of horn 10. The section 13 is provided with a reflecting movable piston end wall 16 designed to electrically terminate the wave guide system and to facilitate concentration of the transmitted components $E_a'$ and $E_b'$ respectively at the positions along the plane 4—4 at which are located microwave pick-up conductors 17 and 18 respectively parallel to and perpendicular to the plane of polarization of the incident wave E. The pick-up conductor 17 extends diametrically across the cylindrical section 13 as indicated in Fig. 4. It is electrically connected at one terminal to the cylindrical section 13 by a coaxial stub tuner 19 of which the conductor 17 forms the central conductor and a centrally apertured sliding electrically conducting contactor 20 closely engages the conductor 17 and the inner wall of the outer coaxial member to connect them electrically. At an intermediate point there is intercalated in series in the conductor 17 a microwave rectifier D' preferably of the silicon point contact type. At its other end the conductor 17 passes through an aperture 21 in the wall of the casing 13 so as to be electrically insulated from the casing. The conductor 17 is terminated so far as microwave oscillations are concerned in a capacitor plate 22 which is integrally connected with the conductor 17 and overlies the aperture to such an extent as to shield it against leakage of microwave energy. The plate 22 is separated from the conducting shell 13 by an intermediate layer 29 of dielectric material to constitute a microwave by-pass capacitor. In similar fashion the conductor 18 terminates at one end in a coaxial stub tuner 23 and at the other end in a capacitor plate 24 and includes a series microwave rectifier D''.

The microwave energy pick-up paths of the two detectors are connected in series through the two capacitances at plates 22 and 24 and the intervening portion of the casing 13. The rectified unidirectional electromotive forces produced by the rectifying detectors D' and D'' set up an effective potential difference between the plates 22 and 24. This potential difference gives rise to a current passing externally through conductors 25 and the primary winding of transformer 26, the secondary winding of which is connected to a telephone or other indicating instrument 27. A milliammeter or other unidirectional current indicator 28 may be connected in the circuit of the primary winding of the transformer.

In use the microwave receiving system is so oriented with respect to the received energy as to cause the electric vector of that energy to be disposed obliquely with reference to the wave guide section 11 such that the component energies associated respectively with the vectors $E_a'$ and $E_b'$ are of equal intensity at the plane 14. If the incoming waves are at the frequency $f_1$ and if the tuning piston 16 be so adjusted as to reflect the oscillations to cause reinforcement of the field intensity at the transverse plane along the line 4—4 of Fig. 2, the components $E_a'$ and $E_b'$ will, after their passage through wave guide section 11, differ in phase by an integral number of wavelengths as defined by Equation 3. They will hence combine to produce a dominant wave polarized in the plane of conductor 17. A unidirectional electromotive force will then appear across the rectifying detector D'. No electromotive force will appear across D'' since the conductor 18 lies in a plane perpendicular to the plane of polarization of the microwave field. Consequently a current will flow through the circuit 25, 26 in one direction. If, however, the incoming waves are at the frequency $f_2$, the component waves $E_a$ and $E_b$ will differ in phase by an odd number of half wavelengths, as indicated by Equation 4, and will combine to produce a dominant wave which is polarized in the plane of conductor 18. A unidirectional current in the circuit 25, 26 will then be produced by the rectifying action of the detector D'' and will be in the opposite direction to the current produced at the frequency $f_1$. If the incoming waves are at a frequency $f_0$ midway between $f_1$ and $f_2$ the dominant wave will be circularly polarized, and equal electromotive forces will appear across the detectors D' and D''. The resultant current flowing in the circuit 25, 26 will be zero since the two electromotive forces are connected in series opposition. If the incoming waves are at any frequency between $f_1$ and $f_0$ the dominant wave will be elliptically polarized such that the electromotive force developed across D' will exceed that developed across D''. The resultant current in circuit 25, 26 will then be in the same direction but of lower intensity than the current which will flow when the impressed wave is at the frequency $f_1$. If the incoming waves are at any frequency between $f_0$ and $f_2$ the dominant wave will be elliptically polarized such that the electromotive force developed across D'' will exceed that developed across D'. The resultant current in circuit 25, 26 will then be in the same direction but of lower intensity than the current which will flow when the impressed wave is at the frequency $f_2$. It follows that, beginning with the zero rectified current corresponding to the nominal carrier frequency $f_0$, the current through the circuit 25, 26 will increase in one direction as the frequency increases as, for example, in the case of incoming waves frequency-modulated by speech currents at one polarity and will reach a maximum at the frequency $f_2$. As the frequency decreases from the value $f_0$ when the polarity of the modulating speech current is reversed, the current in circuit 25, 26 will rise in the opposite direction and reach a maximum value at the frequency $f_1$. It will be apparent that the magnitude and direction of the rectified current in the circuit 25, 26 will be determined by the instantaneous frequency of the microwave energy applied to the input of the receiver. If a speech frequency modulated microwave is applied to the input of the receiver the current in the circuit 25, 26 will vary in accordance with the speech or other modulating signal. This will give rise in the secondary circuit of the transformer 26 to a variable current corresponding to the modulating signal and therefore perceptible in the telephone 27 as an audible speech sound.

In the foregoing explanation it has been assumed that the horn 10 and the coupler 12 are ideal transformers and that hence they occasion no loss of energy. The explanation which has been presented does not take into account the discontinuities which occur in the system and more particularly those at the ends of the rectangular section. The effects of these irregularities should be compensated for by conventional impedance matching devices such as tuning screws, etc., the adjustment of which may best be made experimentally.

The system disclosed may be used as a frequency meter since the milliammeter 28 which responds to the unidirectional current in the circuit 25 may be calibrated to read directly in frequency. This enables the mircowave frequency to be measured automatically with no manual adjustments or tuning manipulation.

Fig. 5 illustrates a modification of the circuit of Fig. 4 in which the casing 13 may be grounded as at 39 and in which two milliammeters 31 and 32 are connected, one to each terminal of the primary winding of transformer 26. The microwave frequency circuits of the detectors D', D'' remain the same as in the system of Fig. 4. However, the rectified current from the detector D' now may pass by way of the meter 31, the lower section 33 of the primary winding of transformer 26, ground 34 and ground 30 back to the detector D' without traversing the detector D''. This considerably augments the rectified current produced by the detector D' since it is no longer necessary for it to overcome the reverse direction resistance of the detector D''. In similar fashion the rectified current produced by detector D'' may pass through the meter 32, the upper section 35 of the primary winding of transformer 26, ground 34 and 30 back to detector D''. It will be noted that the rectified currents produced by the detectors D' and D'' pass through the respective portions of the primary winding of transformer 26 in opposite directions as indicated by the arrows. Accordingly, the net effect of these two currents in inducing an audio frequency electromotive force in the secondary winding of transformer 26 is in general much the same as if the rectified electromotive forces producing these currents had been opposed to each other in a single circuit as in the case of Fig. 4. Accordingly, the audio frequency electromotive force impressed by the secondary winding of transformer 26 upon the amplifier 36 will give rise in the loudspeaker 37 to amplified speech or other sound signals corresponding to those by which the incoming carrier wave represented by vector E was originally frequency-modulated.

In addition to the advantage of the circuit of Fig. 5 in presenting lower impedances for the rectified currents by the respective detectors another advantage is had when the apparatus is used as a carrier wave frequency indicator. This is because in the system of Fig. 4 an indication of the meter 28 may faithfully correspond with incoming frequency so long as the system is provided with a volume level regulator so that the meter 28 will not be affected by changes of volume but only by changes of frequency. However, in the system of Fig. 5 in which the two meters 31 and 32 are provided no volume level regulation is necessary. When the indications of the two meters are equal it will be apparent that the frequency of the incoming carrier wave is $f_0$. When meter 31, only, reads zero it will be apparent that the incoming frequency is one of the limiting frequencies, for example, $f_2$, while when meter 32, only, reads zero, the incoming frequency is the other limiting frequency $f_1$. For unequal readings of the two meters the incoming frequency will be indicated by the relative magnitudes as will be readily understood.

Fig. 6 illustrates a system in which advantage is taken of the properties of anisotropic dielectric substances to enable a square wave guide section to present to microwaves traversing the section different phase velocities of propagation for microwave components having transverse electric polarizations in different directions. Many dielectric substances possessing the anisotropic dielectric characteristic are known, as for example, quartz, tourmaline and Rochelle salt. In the system of Fig. 6 the rectangular wave guide section 40 instead of having unequal dimensions $a$ and $b$, as in the case of wave guide 11 of Fig. 1, has equal transverse dimensions $d$ and $d'$ and is therefore of square cross-section. Within the section 40 is a dielectric filler 41 of an anisotropic character such that its dielectric capacitance in the direction parallel to the dimension $d'$ greatly exceeds that in the direction parallel to the dimension $d$. Accordingly, the wave guide section 40 serves to transmit waves with a transverse electric polarization perpendicular to the direction $d$ with a phase velocity of transmission which differs greatly from that for waves of the same frequency having an electric vector polarized transversely perpendicular to the direction $d'$. Such a wave guide section although having structural orthogonal transverse dimensions which are equal has electrical dimensions in the orthogonal transverse directions which are unequal as are the transverse electrical dimensions of the rectangular wave guide shown in Figs. 1, 2 and 3. The design of the wave guide section 40 of Fig. 6 should follow the principles outlined in connection with the system of Figs. 1 to 5, inclusive and its operation should be fully apparent from the preceding description of the operation of that system.

Certain electrically anisotropic materials have been described by Habgood and Waring at page 50 of the June 1941 issue of Transactions of the Institution of the Rubber Industry.

While any suitable anisotropic substance 41 may be employed, a very satisfactory dielectric may consist of a composition involving a matrix of a rubber dielectric material, as for example, the solid form of polyisobutylene manufactured by the Standard Oil Company of New Jersey and known in the trade as "Vistanex." In this matrix there may be incorporated minute extremely thin flakes of an electrical conductor such as aluminum. The principal plane surfaces of the aluminum flakes extend in parallel planes. Such a composite dielectric substance exhibits a highly anisotropic dielectric capacitance characteristic with its high capacitance in the direction measured perpendicularly to the planes of the aluminum flakes and a very much lower capacitance in directions parallel to those planes.

Fig. 8 illustrates a modification of the system of Figs. 6 and 7 in which the wave guide section 40 has a circular conformation and is filled with an anisotropic dielectric substance 42 having its direction of highest capacitance at an inclination to the vector E representing the impressed microwaves and preferably at a 45-degree angle with respect thereto.

In lieu of the wave guides 11 and 40 which have been described, any type may be employed which has different propagation characteristics depending upon the angle of polarization of the transverse electric vector. For example, a circular wave guide divided into two transmission channels by a diametrical septum or by diametrical rods may be used.

What is claimed is:

1. A detecting device for frequency modulated microwaves comprising a dielectric guide having a section free from internal discontinuities, said guide section having two transverse axes of symmetry which are perpendicular to each other and of different lengths, means for impressing at one point on said guide a frequency modulated wave polarized transversely in a direction other than that of either axis, pick-up devices disposed in the same transverse plane at a remote point within the guide for selectively receiving two components of the impressed wave of different polarizations, means for detecting each of the components and means connected to the detecting means and responsive to the difference of the detected energies.

2. In a detection system for frequency modulated waves, a wave guide section having different transverse dimensions in different directions and accordingly having different wave propagation velocities for waves of the same frequency but of different transverse polarizations, means for impressing at one point thereon a frequency modulated wave electrically polarized transversely at an angle to the direction of the minimum transverse dimension of the wave guide section, means for deriving from said guide at a remote point two components which are polarized in the same transverse plane at right angles to each other and means for detecting said two components and for deriving from said detected components a current which varies as their instantaneous energy difference.

3. In combination, a wave guide having a rectangular cross-section of unequal dimensions, said wave guide having a homogeneous dielectric therewithin, means for setting up therein a microwave electric field having two equal energy components electrically polarized respectively in the two directions parallel to the sides of the rectangular section, means disposed in the same transverse plane at a remote point within said guide for separately withdrawing two transversely polarized components polarized respectively in directions perpendicular to each other and means for deriving and indicating the difference of the energies of said two components.

4. A system for directly indicating the frequency of microwaves within a predetermined range of frequencies, said system comprising a wave guide of rectangular cross-section and of unequal transverse dimensions, means for impressing upon said guide in one region microwave oscillations whose frequency is to be determined with a transverse electrical polarization in a direction oblique to the sides of the rectangular section, means for deriving from said guide at an electrically remote point two microwave oscillation components which are polarized in the same transverse plane, one of said components having a transverse electrical polarization which is perpendicular to the direction of transverse polarization of the other component and an indicating instrument connected to said last-mentioned means to respond to the difference of the energies of said two components.

5. In combination, a wave guide having a rectangular cross-section of unequal dimensions, said wave guide having a homogeneous dielectric therewithin, means for setting up therein a microwave electric field electrically polarized transversely at an angle to the direction of the minimum transverse dimension of the wave guide section, means disposed in the same transverse plane at a remote point within said guide for separately withdrawing two components polarized respectively parallel to and perpendicular to the direction of polarization of the said microwave electric field and means for deriving and indicating the difference of the energies of said two components.

6. In combination, a wave guide having a square cross-section, said wave guide having an anisotropic dielectric therewithin, means for impressing at one point within the wave guide microwaves within a predetermined frequency range, said microwaves being electrically polarized transversely at an angle to the direction of the minimum transverse dielectric capacitance of the dielectric substance, means for separately withdrawing two orthogonally related components of said impressed waves at a remote point within said guide where the electrical path lengths of said components measured longitudinally of said guide from said one point differ by an integral multiple of wavelengths at one limiting frequency of said frequency range and by an odd multiple of half wavelengths at the other limiting frequency, and means for deriving and indicating the difference of the energies of said two components.

7. A detecting device for frequency modulated microwaves within a predetermined frequency range, said device comprising a dielectric guide having a section free from internal discontinuities, said guide section having two transverse axes of symmetry which are perpendicular to each other and of different electrical lengths, means for impressing at one point on said guide a frequency modulated wave polarized transversely in a direction oblique to that of the two transverse axes, pick-up devices disposed in the same transverse plane at a remote point within the guide for selectively receiving two components of the impressed wave of different polarizations, means for detecting each of the components, and means connected to the detecting means responsive to the difference of the detected energies.

8. In a detection system for frequency modulated waves within a predetermined frequency range, a wave guide section having different electrical dimensions in two orthogonal transverse directions and accordingly having different wave propagation velocities for waves of the same frequency but of different transverse polarizations, means for impressing at one point thereon a frequency modulated wave electrically polarized transversely at an angle to the direction of the minimum transverse electrical dimension of the wave guide section, means for deriving from said guide two components which are polarized at right angles to each other at a remote point where the electrical length of said guide section measured longitudinally of said guide from said one point in the plane of each of said transverse directions is greater in one plane than in the other by an integral multiple of wavelengths at one limiting frequency of said frequency range and by an odd multiple of half wavelengths at the other limiting frequency, and means for detecting said two components and for deriving from said detected components a current which varies as their instantaneous energy difference.

9. Apparatus for indicating the frequency of microwaves within a predetermined frequency range comprising, in combination, a section of wave guide having unequal electrical dimensions along two transverse axes of symmetry, the length $l$ of said guide section being given by the expressions $$l = \frac{\lambda_{1a}\lambda_{1b}}{\lambda_{1b} - \lambda_{1a}} n$$

at one limiting frequency of said frequency range and by the expression $$l = \frac{\lambda_{2a}\lambda_{2b}}{\lambda_{2b} - \lambda_{2a}} (n - \tfrac{1}{2})$$

at the other limiting frequency, where the symbols $\lambda_{1a}$, $\lambda_{1b}$, $\lambda_{2a}$, and $\lambda_{2b}$ represent the wavelength in the guide at said limiting frequencies of waves which are transversely electrically polarized in directions parallel to said transverse axes of symmetry and where the symbol $n$ is a positive integer, means for impressing said microwaves at one point upon said guide with a transverse electrical polarization oblique to said transverse axes of symmetry, means at a remote point in said guide for separably deriving two wave components which are transversely electrically polarized in the same transverse plane and in orthogonal directions to one another, means for detecting said derived components, and means for differentially combining said detected components and producing an indication corresponding to their energy difference.

10. A detecting system for frequency-modulated waves lying within a predetermined frequency range comprising, in combination, a non-circular section of wave guide having uniformly different transmission characteristics for waves of the same frequency but of different directions of transverse electrical polarization, means for impressing at one point microwaves of the frequency to be measured upon said guide with a transverse electrical polarization oblique to said transverse axes of symmetry, means for deriving from said guide two wave components which are transversely electrically polarized in orthogonal directions to one another at a remote point where the electrical path lengths of said orthogonal components measured longitudinally of said guide from said one point differ by an integral multiple of wavelengths at one limiting frequency of said frequency range and by an odd multiple of half wavelengths at the other limiting frequency, means for detecting said derived components, and means for differentially combining said detected components and for indicating their energy difference.

11. In combination, a circular wave guide having an anisotropic dielectric therewithin, means for impressing at one point within the wave guide microwaves within a predetermined frequency range, said microwaves being electrically polarized at an angle to the direction of the maximum transverse dielectric capacitance of the dielectric substance, means for separately withdrawing two orthogonally related components of said impressed waves at a remote point within said guide where the electrical path lengths of said components measured longitudinally of said guide from said one point differ by an integral multiple of wavelengths at one limiting frequency of said frequency range and by an odd multiple of half wavelengths at the other limiting frequency, and means for indicating the difference of the energies of said two components.

SLOAN D. ROBERTSON.

REFERENCES CITED

The following references are of record in the file of this patent:

UNITED STATES PATENTS

| Number | Name | Date |
|---|---|---|
| 2,106,770 | Southworth | Feb. 1, 1938 |
| 2,129,669 | Bowen | Sept. 13, 1938 |
| 2,257,783 | Bowen | Oct. 7, 1941 |
| 2,283,935 | King | May 26, 1942 |
| 2,393,414 | Roberts | Jan. 22, 1946 |
| 2,413,939 | Benware | Jan. 7, 1947 |
| 2,420,892 | McClellan | May 20, 1947 |
| 2,443,612 | Fox | June 22, 1948 |
| 2,464,269 | Smith | Mar. 15, 1949 |